US008010629B2

(12) United States Patent
Lanahan et al.

(10) Patent No.: US 8,010,629 B2
(45) Date of Patent: Aug. 30, 2011

(54) SYSTEMS AND METHODS FOR UNIFICATION OF LOCAL AND REMOTE RESOURCES OVER A NETWORK

(75) Inventors: James W Lanahan, Palo Alto, CA (US); Dane M Howard, Los Gatos, CA (US); Brian F Williams, San Carlos, CA (US)

(73) Assignee: eBay, Inc., San Jose, CA (US)

( * ) Notice: Subject to any disclaimer, the term of this patent is extended or adjusted under 35 U.S.C. 154(b) by 156 days.

(21) Appl. No.: 12/495,756

(22) Filed: Jun. 30, 2009

(65) Prior Publication Data

US 2010/0005168 A1 Jan. 7, 2010

Related U.S. Application Data

(60) Provisional application No. 61/078,288, filed on Jul. 3, 2008.

(51) Int. Cl.
*G06F 15/16* (2006.01)
(52) U.S. Cl. ....................................... 709/218
(58) Field of Classification Search ................... 709/218
See application file for complete search history.

(56) References Cited

U.S. PATENT DOCUMENTS

| | | | |
|---|---|---|---|
| 2001/0034740 A1 | 10/2001 | Kerne | |
| 2001/0044825 A1* | 11/2001 | Barritz | 709/203 |
| 2002/0083178 A1* | 6/2002 | Brothers | 709/226 |
| 2002/0108122 A1* | 8/2002 | Alao et al. | 725/117 |
| 2002/0112093 A1* | 8/2002 | Slotznick | 709/329 |
| 2004/0008226 A1* | 1/2004 | Manolis et al. | 345/769 |
| 2004/0083080 A1 | 4/2004 | Reghetti et al. | |
| 2005/0114754 A1 | 5/2005 | Miller et al. | |
| 2005/0138193 A1* | 6/2005 | Encarnacion et al. | 709/230 |
| 2006/0206811 A1 | 9/2006 | Dowdy | |
| 2006/0256739 A1 | 11/2006 | Seier et al. | |
| 2007/0074110 A1 | 3/2007 | Miksovsky et al. | |
| 2008/0027798 A1 | 1/2008 | Ramamurthi et al. | |
| 2008/0134018 A1 | 6/2008 | Kembel et al. | |
| 2010/0005168 A1* | 1/2010 | Williams et al. | 709/224 |

OTHER PUBLICATIONS http://blog.justswell.org/drag-and-drop-files-from-your-desktop-to-your-browser-using-javascript/, Jul. 28, 2009.*
http://googlesystem.blogspot.com/2007/02/upload-files-in-browser-using-drag-and.html, Feb. 23, 2007.*

* cited by examiner

*Primary Examiner* — Ajay Bhatia
(74) *Attorney, Agent, or Firm* — Haynes and Boone LLP

(57) ABSTRACT

The system and methods disclosed herein, according to one or more embodiments, utilize locally stored resources in a secure manner within a network-based application, while allowing locally stored resources to be shared over a network. In one embodiment, a system and method for facilitating information transactions over a network include communicating with a user device and one or more distribution channels via the network, installing a local network server on the user device, monitoring user drop events, generating resource mapping of media resources based on the user drop events, and uploading media resources.

19 Claims, 5 Drawing Sheets

SYSTEMS AND METHODS FOR UNIFICATION OF LOCAL AND REMOTE RESOURCES OVER A NETWORK

CROSS-REFERENCE TO RELATED APPLICATIONS

This application claims priority to and benefit of U.S. Provisional Patent Application No. 61/078,288, filed Jul. 3, 2008, entitled, "Multi-Media Online Presentation System and Method," which is incorporated herein by reference in its entirety.

BACKGROUND

1. Technical Field

The present invention generally relates to network-based multi-media presentations and, more particularly, to unification of local and remote resources over a network.

2. Related Art

Presently, in reference to creating and posting online media presentations, a user must typically purchase conventional media presentation software, which may be expensive, create a media presentation with the conventional media presentation software, which is often time consuming, upload the rile for the media presentation, and then post a link to a file for online access to the created media presentation, which may require security features. To view the posted media presentation, another user must access the site storing the file, pass some form of access security features, download the file from the communication network, and have the same software that created the file for viewing. Unfortunately, this sequence of creating and downloading the media presentation is often expensive, time-consuming, and inconvenient for each user involved in the process.

Another problem when working with web-based applications is the issue of dealing with mixed local and remote resources. In general, users typically utilize resources (i.e., files, documents, and media) that are stored locally on a user device, but these locally stored resources are usually inaccessible to web applications for security reasons. The traditional web application forces users to locate these assets and upload them to a server environment, after which they are available for working within a web-based application. As such, there exists a need to simplify the process of creating and publishing online media presentations over a communication network.

SUMMARY

Embodiments of the present disclosure provide a system and method for utilizing locally stored resources in a secure manner within a network-based application, while allowing locally stored resources to be shared over a network, such as the Internet.

In accordance with one or more embodiments of the present disclosure, a system and method for facilitating information transactions over a network include communicating with a user device and one or more distribution channels via the network, installing a local network server on the user device, monitoring user drop events, generating resource mapping of media resources based on the user drop events, and uploading media resources.

In various implementations, the method includes gathering media resources based on user input, creating a media presentation with the media resources based on user input, and publishing the media presentation by distributing the media presentation to the one or more distribution channels via the network. The method includes verifying communication with the user device and installing a plug-in module on the user device that is adapted to install the local network server on the user device and monitor user drop events, wherein monitoring the user drop events comprises passing one or more filenames of local file resources to the plug-in module. The method includes generating a browser callback to detect user drop events and translating file formats of media resources to recognizable media formats.

In one implementation, the method includes storing the media resources in a storage component of the user device, and the media resources comprise local file resources stored locally on the user device. In one implementation, generating resource mapping of media resources comprises mapping a local file resource to a secure URL, wherein the secure URL supports one or more query parameters including at least one of resolution, rotation, and media format. In another implementation, the method includes processing secure URL queries by accessing media resources via one or more secure URLs. In one implementation, the method includes receiving an HTTP request for a local file resource, checking for a secure URL related to the local file resource, retrieving the local file resource if a secure URL exists for the local file resource, and applying one or more requested query parameters to the local file resource including at least one of resolution, rotation, and media format.

These and other features and advantages of the present disclosure will be more readily apparent from the detailed description of the embodiments set forth below taken in conjunction with the accompanying drawings.

Figure 1:
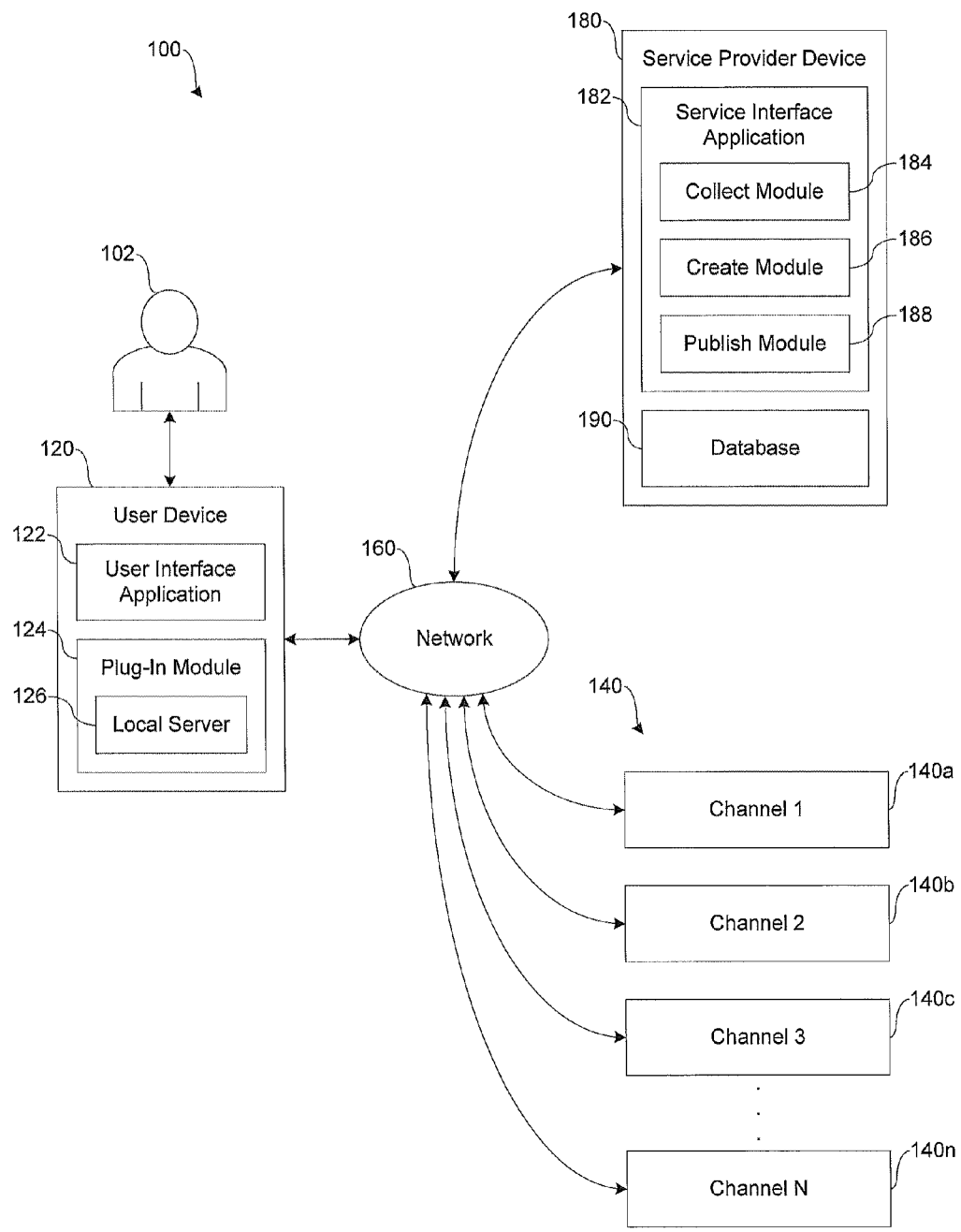
FIG. 1 shows a block diagram of a system to facilitate unification of local and remote resources over a network, in accordance with an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The system and methods disclosed herein, according to one or more embodiments, utilize locally stored resources in a secure manner within a network-based application, while allowing locally stored resources to be shared over a network, such as the Internet. The system and methods disclosed herein are also adapted to facilitate collecting various types of media, creating multi-media presentations, and publishing multi-media presentations over the network for viewing by other users in communication with the network. Further scope and function related to these features are described in greater detail herein.

FIG. 1 shows one embodiment of a block diagram of a system 100 adapted to facilitate collecting various types of media, creating multi-media presentations, and publishing multi-media presentations over the network 160. As shown in FIG. 1, the system 100 includes at least one client device 120 (e.g., network computing device), one or more multi-media distribution channels 140 (e.g., network server devices), and at least one service provider device 180 (e.g., network server device) in communication over the network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the at least one client device 120, the multi-media distribution channels 140, and the at least one service provider device 180 may be associated with a particular link (e.g., a link, such as a URL (Uniform Resource Locator) to an IP (Internet Protocol) address).

The at least one client device 120, in various embodiments, may be implemented using any appropriate combination of hardware and/or software configured for wired and/or wireless communication over the network 160. In various implementations, the client device 120 may be implemented as a personal computing device (e.g., a personal computer (PC)) in communication with the network 160, such as the Internet. In various other implementations, the client device 120 may be implemented as one or more wireless telephones (e.g., cell phones), personal digital assistants (PDAs), notebook computers, and/or various other generally known types of wired and/or wireless computing devices. It should be appreciated that the client device 120 may be referred to as a user device or customer device without departing from the scope of the present disclosure.

The client device 120, in one embodiment, includes a user interface application 122, which may comprise a network-based application (e.g., a web-based application) and may be utilized by a user 102 to conduct information transactions with the distribution channels 140 and the service provider server 180 over the network 160. For example, the user interface application 122 may be implemented as a multi-media presentation application to collect, create, and publish information via the network 160. In various implementations, media (e.g., photo-images, audio, video, music, etc.) may be collected from various sources (e.g., local PC storage, remote data storage, Rich Site Summary (RSS) feeds, online websites, other online sources, etc.), multi-media presentations may be created, and the multi-media presentations may be published to and/or shared with one or more of the multi-media channels 140 via the user interface application 122 over the network 160.

In one implementation, the user interface application 122 comprises a software program, such as a graphical user interface (GUI), executable by a processor that is configured to interface and communicate with the multi-media channels 140 and the service provider server 180 via the network 160. In another implementation, the user interface application 122 comprises a browser module that provides a network interface to browse information available over the network 160.

For example, the user interface application 122 may be implemented, in part, as a web browser to view information available over the network 160. In another example, each member of the user group 102 is able to access multi-media websites via the one or more multi-media channels 140 to view, collect and publish multi-media presentations over the network 160.

The client device 120, in one embodiment, comprises a plug-in module 124 that is adapted to interface with the user interface application 122 to provide a local web server 126 for use by the client device 120. The plug-in module 124 is adapted to extend the behavior of the user interface application 122, such as when implemented as browser, using one of several standard browser plug-in APIs (i.e., application programming interfaces). In one implementation, the plug-in module 124 installs the client-side local web server 126 that runs external to the browser. The user interface application 122, when implemented as a browser, includes a JavaScript API file adapted to initialize the plug-in module 124 with a session ID 30 and setup application callbacks for certain events. Once initialized, the plug-in module 122 is adapted to verify that a local web service is running, start the local web service if not running, and register for user drag and drop events. Further scope related to the plug-in module 124 and the local server 126 is described in greater detail herein.

The client device 120, in various embodiments, may include other applications as may be desired in one or more implementations to provide additional features available to the user 102. In one example, such other applications may include security applications for implementing client-side security features, programmatic client applications for interfacing with appropriate APIs over the network 160, and/or various other types of generally known programs and/or applications. In other examples, these other applications may interface with the user interface application 122 for improved efficiency and convenience. For example, files, data, and/or various types of information may be imported from multi-media software directly into the user interface application 122 for ease of access to multi-media files (e.g., audio, video, pictures, clip-art, etc.).

The client device 120, in various embodiments, may include a user identifier, which may be implemented, for example, as operating system registry entries, cookies associated with the user interface application 122, identifiers associated with hardware of the client device 120, or various other appropriate identifiers. The user identifier may include attributes related to the user 102, such as personal information (e.g., a user name, password, etc.). In one implementation, the user identifier may be passed to the service provider server 180 during publishing mid/or sharing of a multi-media presentation.

The multi-media distribution channels 140, in one embodiment, may be maintained by one or more resource providers and/or entities (e.g., social networking sites, resource information sites, management sites, merchant sites, etc.) in communication with the network 160. As such, the multi-media distribution channels 140 may be implemented using any appropriate combination of hardware and/or software configured for wired and/or wireless communication over the network 160. In one implementation, the multi-media distribution channels 140 may be implemented as a network computing device (e.g., a network server) in wired and/or wireless communication with the network 160.

The service provider server 180, in one embodiment, may be maintained by an online transaction processing provider and/or entity in communication with the network 160. As such, the service provider server 180 may be implemented using any appropriate combination of hardware and/or software configured for wired and/or wireless communication over the network 160. In one implementation, the service provider server 180 may be implemented as a network computing device (e.g., a network server) in wired and/or wireless communication with the network 160. As shown in FIG. 1, the service provider server 180 includes a service interface application 182, which may be adapted to interact with the client device 120 to facilitate publishing and/or sharing multi-media presentations over a network. In one example, the service provider server 180 may be provided and implemented by PayPal, Inc. of San Jose, Calif., USA.

The service application 182, in one embodiment, utilizes a collect module 184, a create module 186, and a publish module 188 to collect information, create presentations, and publish presentations, respectively. As described in greater detail herein, the modules 184, 186, 188 enable users, such as the user 102, to collect diverse types of audio and visual media, create rich multi-media presentations with real-time editing and authoring using media software, such as Flash, and then share and/or publish the rich multi-media presentations with other users via the network 160. In one example, the collect, create, and publish modules 184, 186, 188 may be implemented within a standard web browser for interfacing with the user 102.

In one implementation, the user 102 is able to share multi-media presentations with other users via the media channels 140 and/or embed multi-media presentations directly in webpages of other users. For example, the user 102 may provide a unique URL link for the multi-media presentation to other users. In another example, the user 102 may directly email multi-media presentations to multiple recipients and include a message with the email. In still another example, the user 102 may provide the source HTML (i.e., HyperText Markup Language) code to other users and/or embed the source HTML code directly into other user's webpages. Still other examples include the ability to publish multi-media presentations on a website to sell a particular item or service for purchase. For items and/or services, a media rich presentation helps users market and sell items and/or services, which may be valuable for high-end or high-priced items and/or services. Social and/or dating sites may utilize these multi-media presentations to provide online users with a way to better present themselves to other online users. In various implementations, some types of webpages may be presented in a more dynamic manner by utilizing Rich Site Summary (RSS) feeds, since, for example, a particular user's presentation may be continually changing with new media.

The service provider server 180, in various embodiments, may be configured to maintain, store and/or archive multi-media presentations in a database 190, each of which may include information related to one or more users, such as the user 102, and one or more multi-media channels; such as multi-media distributions channels 140. In various examples, the multi-media presentations may include attributes stored as part thereof, and the attributes may be passed to the service provider server 180 as part of a creating, publishing and/or sharing the multi-media presentations.

Referring to FIG. 1, the collect module 184, in one embodiment, enables the user 102 to collect audio, photographic images, video, and music media from various sources, such as a PC, RSS feeds, websites, and any other online source, via a user interface, such as the user interface application 122. In various implementations, the user interface application 122 comprises multiple tabs and/or links for the various sources. Once collected, the media may be saved and categorized in the database 190 and edited on the system site via the service provider server 180. Editing may include one or more of sizing, rotating, overlying, moving and stacking various media backward and forward with an overlay or stack. Video may be broken up automatically by the service provider server 180 into smaller segments. Selected video segments may be combined and/or used as desired. Selected media may be placed on a virtual storyboard, such as a clipboard, on the same screen as the collection of media. Media may be edited either in the collection or in the storyboard. Placing desired media on the storyboard may be accomplished by dragging and dropping. In one example, the collect module 184 provides selected media on a storyboard. In another example, the collect module 184 provides media on a user's media page (i.e., not placed on the storyboard). In still another example, uploading media may be delayed until editing is completed.

Referring to FIG. 1, the create module 186, in one embodiment, enables the user 102 to place selected media onto a presentation style, board or collage. The service provider server 180 may automatically suggest a story idea to launch the creative process, or the user 102 may select a specific style or presentation tool. In one implementation, media from the storyboard may be dragged and dropped onto the presentation. Within the presentation, there may be multiple styles, such as a picture frame, a television, a billboard, etc. Media may be placed within the viewing window of each type of style. Once in the presentation, the media may be edited. For example, the media may be rotated, sized, cut-out (e.g., by selecting the boundaries of an image, such as with clicks to designate points along the boundary, enabling as coarse or fine a resolution as desired), moved forward or backward in relation to adjacent media, slide multiple images to add or remove spaces within the presentation, and adding a hotspot (e.g., selecting an area of the image for additional information, such as adding a link, video, text, etc.). Other editing features may include adding audio to the background, adding text, and/or distorting images. In one aspect, the editing may be achieved in real-time so that the user 102 may quickly and easily see the results and change them as needed.

Referring to FIG. 1, the publish module 186, in one embodiment, enables the user 102 to share, publish and/or distribute the presentation when, for example, the presentation is completed. In one implementation, as described herein, the presentation may be saved in the database 190 of the service provider server 180. Once saved, the user 102 may share, publish and/or distribute presentations to any selected channel, such as one or more of the multi-media channels 140. Any users on the network 160 having access to the channels 140 or website related to the channels 140 may refresh the view, which may automatically load the presentation into that channel and/or website for viewing the content of the presentation. As such, the presentations may be distributed to various online websites, blogs, mobile video players, and IP TV networks, and/or on the system site.

These modules 184, 186, 188 may be combined, used, and/or modified to provide the user 102 with different initial choices regarding the type of presentation and features desired for creating the presentation. The choices may be a simple, easy to use tool to quickly build 25 presentations with dynamic content from RSS feeds and online albums. Accordingly, the user 102 may select a presentation style and then link it to the user's media libraries through RSS feeds that maintain an "always on" permalink to the content source.

Figure 2A:
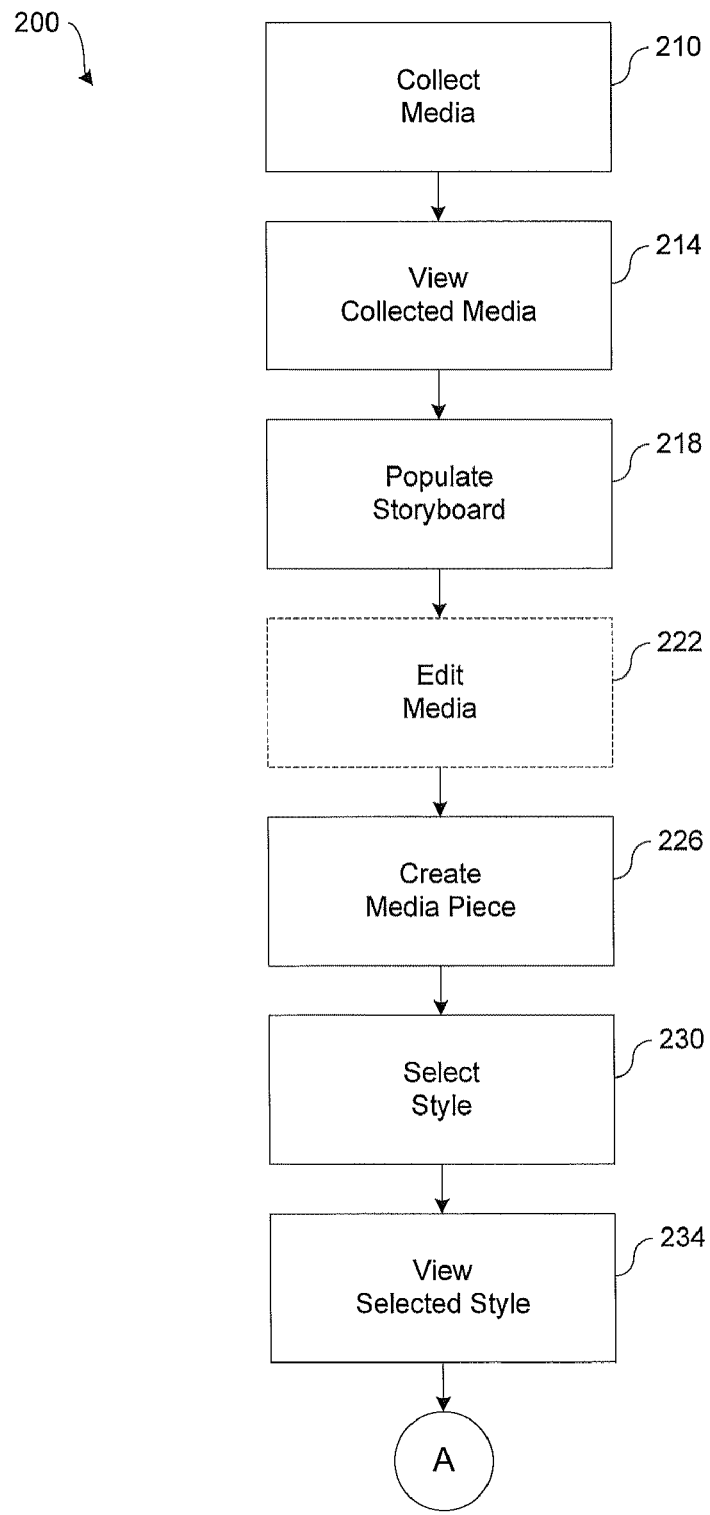
FIGS. 2A-2B show a block diagram of a method adapted to facilitate collecting media, creating multi-media presentations, and publishing multi-media presentations over a network, in accordance with an embodiment of the present disclosure.
Figure 2B:
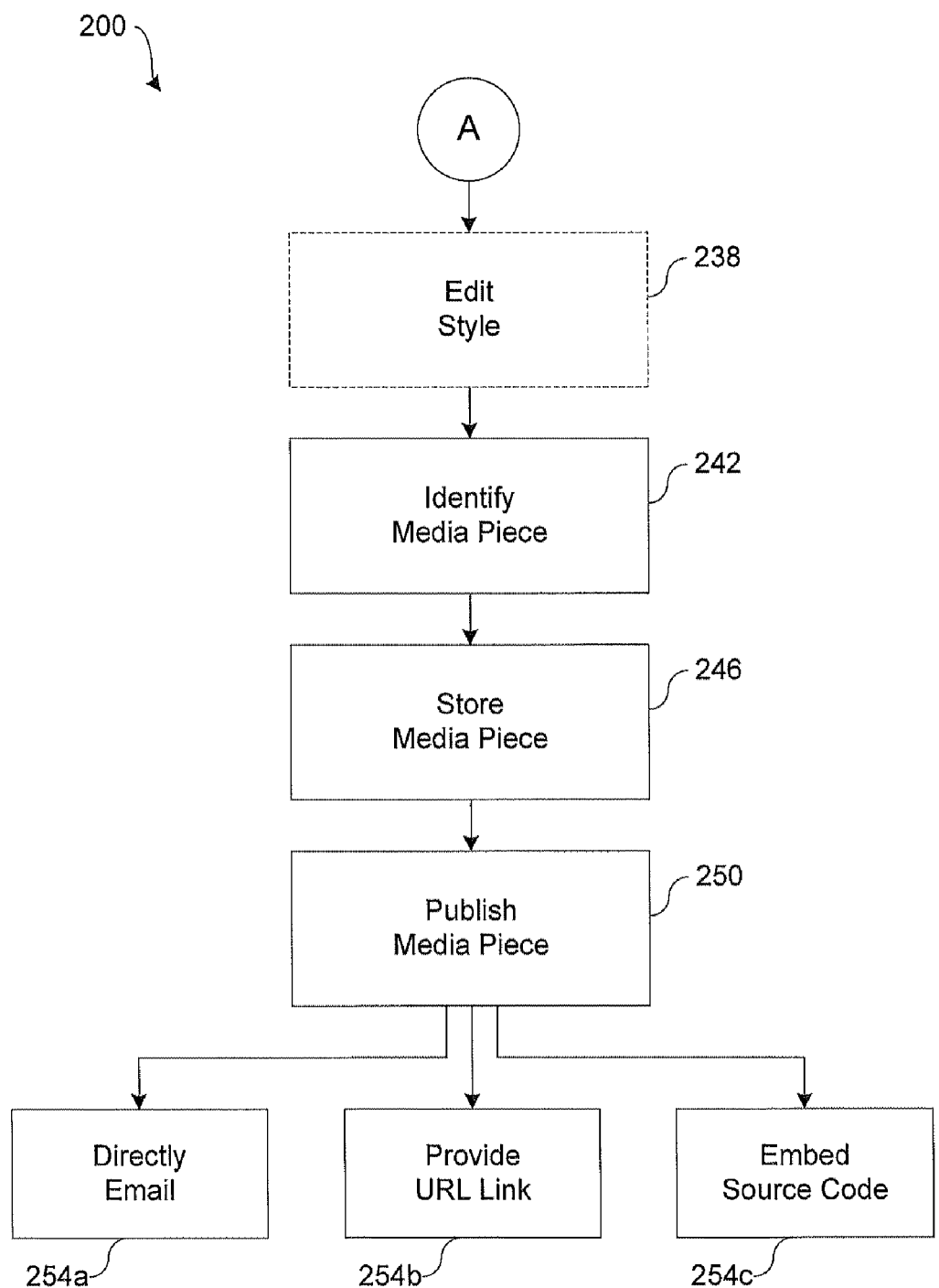

FIGS. 2A-2B show one embodiment of a block diagram of a method 200 adapted to facilitate collecting media, creating multi-media presentations, and publishing multi-media presentations over the network 160, in reference to FIG. 1. It should be appreciated that the order of the following process flow may be rearranged without departing from the scope of the present disclosure.

Referring to FIG. 2A, the method 200 comprises collecting media for a multi-media presentation (block 210). In various implementations, media such as photographic images, audio, video, music, etc. may be collected from a variety of sources including local sources, such as a personal computer (PC), and online sources, such as the Internet, for use in the media presentation or media piece. For example, an online search engine may be accessed and one or more keyword searches may be utilized to search the Internet for various types of media content. In another example, additional media may be collected from other sources, such as media from a PC, which may be selected, uploaded and viewed. As such, media from different sources may be viewed by selecting corresponding media source tabs from the user interface application 122. Media may be viewed as individual media items or clustered such that each of the individual media items within the cluster may be viewed. In one aspect, the user interface application 122 interfaces with the service interface application 182 via the network 160 to utilize the collect module 186 for collecting media. In another aspect, any media collected may be displayed on the user device 120 via the network 160 for viewing by the user 102 in a media collection area of the user interface application 122 (block 214).

Next, the method 200 comprises populating a storyboard (block 218). In one implementation, the user interface application 122 includes a graphical storyboard, which may be populated with collected media from one or more of the media items or a cluster of media items collected from various media sources. For example, the graphical storyboard may include one or more images of items and/or clustered items collected from the Internet and items uploaded from a PC.

Next, optionally, one or more of the media items may be edited (block 222). In various implementations, media positioned on the graphical storyboard may be edited prior to generating the media presentation or media piece, and/or individual media items in a media cluster may be reordered.

Next, the media presentation or media piece may be created (block 226). In one implementation, once media items have been collected and optionally edited, the media presentation or media piece may be created by selecting a creation operation of the user interface application 122. In one aspect, the user interface application 122 interfaces with the service interface application 182 via the network 160 to utilize the create module 186 for creating the media presentation or media piece.

In various implementations, creating the media presentation and/or media piece may include selecting and/or customizing its style (block 230) and viewing the selected and/or customized style (block 234). For example, presentation styles may include, but are not limited to, a picture frame, billboard, kaleidoscope, street scene, landscape, etc. Once a style is selected, media items from the storyboard may automatically flow into or populate the selected style. Some styles, such as kaleidoscope style, support movement of media as part of a presentation style and provides various customizable characteristics of movement, such as speed of media rotation, etc., within the style. In one aspect, the customized style may be displayed on the user device 120 via the network 160 for viewing by the user 102.

Next, referring to FIG. 2B, the selected and/or customized style of the media presentation or media piece may be optionally edited (block 238). In various implementations, if further editing of media presentation style is desired, style editing tools may be provided to the user interface application 122 via the create module 186. These editing tools may include the ability to preview the media presentation or media piece, edit the media presentation or media piece (e.g., scale, rotate and/or move frames directly onto the media presentation or media piece), add text and/or captions to the media presentation or media piece, add audio, sound, music and/or voiceover to the media presentation or media piece, placement of a frame and/or masking of the media presentation or piece, and add background images and/or color to the media presentation or media piece. For example, a sound and/or audio feature may provide options, such as adding music to particular media or background, having the music vary in loudness depending on time and/or spatial indicators, and having a repeating playlist that repeats particular music and/or plays different segments in a random manner.

Next, the method 200 comprises providing identifying information (block 242) about the media presentation or media piece (e.g., a title, storage location and/or various types of descriptive information) and deciding where to store the media presentation or media piece (block 246). In one implementation, the user 102 may identify and/or a select one or more distribution channels located on an associated server for storage of the media presentation or media piece or choose an alternative storage location in the network 160.

Next, the method 200 comprises publishing, sharing and/or broadcasting the media presentation or media piece via the network (block 250). In various implementations, the media presentation or media piece may be published or distributed to a site accessible via the network 160 for viewing by one or more other network users in communication with the network 160. For example, the media presentation or media piece may be directly emailed (block 254a) to one or more recipients (i.e., other network users), along with a message. In another example, an associated URL link (block 254b) for the media presentation or media piece may be given (e.g., via email or some type of text message) to one or more recipients (i.e., other network users) for direct access to the media presentation or media piece via the network 160. In still another example, source code (block 254c) for the media presentation or media piece may be obtained by the user 102 and embedded into a web page managed by the user 102 via the network 160.

Accordingly, in various implementations, the user 102 may email the media presentation or media piece to other network users via the network 160, embed the media presentation or media piece in a web page that is accessible via the network 160, and/or create a URL permalink of the media presentation or media piece to one or more of the multi-media distribution channels 140 in the network 160.

In one implementation, the service interface application 182 allows users to compose multi-media stories, presentations and pieces by laying out photographic images, video, text and audio on a stage, storyboard or collage. In one aspect, a multi-media story may begin from an unpopulated storyboard. The user 102 may select to view and work with a sample story until the user 102 is ready to begin the media story. Multi-media items from various sources may be viewed by selecting source tabs of the user interface application 122.

Once the user 102 is ready to create a media story, the user 102 accesses a collage storyboard. In one aspect, the storyboard or stage progressively moves in a first direction, such as a left or right direction, and when viewed, may appear as a movie adapted to present a linear narrative in time and/or space. In another aspect, the stage may progressively move in a second direction, such as upward or downward. As such, this may also be presented as a movie adapted to present a linear narrative in time and/or space. The vertical orientation may represent physical structures that have height and/or depth, such as buildings, structures, monuments and/or geological strata. In still another aspect, the stage may be adapted to progressively move in a plurality of directions and may be presented as real or virtual spaces in two or three dimensions.

In various implementations, multi-media items from various sources may be uploaded from the network 160, or previously collected media items may be used to populate the storyboard by selecting desired multi-media items. A multi-media item may be repositioned within the storyboard by dragging and dropping the multi-media item to another location in the storyboard. Similarly, a multi-media item may be removed from the storyboard by dragging and dropping the multi-media item from the storyboard. In one aspect, once multi-media items are positioned within the storyboard, the media story may be edited. In this regard, a rich interface may be presented to users within a predefined screen area.

In various embodiments, the service interface application 182 utilizes a number of innovative techniques. For example, a first technique utilizes one or more direct-attached media-specific tools. When selecting any media object on the stage, a highlight rectangle appears around the object. Attached to the rectangle around the media object are a number of tools, some generic for all media types, others specific to the media type. By showing the tools in close proximity to the media object, it is easier for users to understand the relationship of the tool to the media object. For each tool, an edge may be specified (e.g., expressed as a number from 0-3, 0=top, 1=right, 2=bottom and 3=left), a position along the edge (e.g., expressed as a ratio of edge length) and an offset from the edge (e.g., expressed as a factor of the tool's size). Whenever updating a position of a tool, an absolute position may be calculated or recalculated based on various parameters.

In another example, another technique utilizes a rotation invariant display of tools. If a user 102 rotates a media object using a rotate tool, the associated tools remain fixed to the original object constraint point (i.e., they do not rotate, thereby making it easier for the user to read the icons). Once a rotation is complete, the attached edge is calculated or recalculated based on the perceived edge, and if necessary fades the tool out from a previous location to a new location. As such, the user 102 may be accustomed to finding certain tools in certain positions relative to a media object, irrespective of the media object's rotation.

In another example, another technique utilizes a slide tool. When working with media that may progressively move in a particular direction, user selection and manipulation of individual media objects may become a challenge. Traditional techniques of multiple selection and direct manipulation break down when dealing with large documents. The slide tool allows the user 102 to perform an action that may be difficult, such as insert or remove horizontal space within a collage or story. The user 102 selects a media object to reveal the media specific tools. The slide tool is affixed to an edge of the media object, and when grabbed, the slide tool selects one or more media objects at or to the other edge of the selected media object, and allows side-to-side sliding during a user action. In one aspect, this technique may be utilized for a vertically oriented collage or story, which would present the slide tool on an upper edge of the selected media object and allow dragging of layers at or below the selected object.

In another example, another technique utilizes a drag and drop insertion. The user 102 may drag thumbnails representing media objects from a media tab and drop them onto the stage or storyboard. As the user 102 drags the thumbnail over the stage, an insertion point indicator is presented to the user 102 showing where an edge of the dropped item may be located during user action, such as, if the user's mouse is released. If the user's mouse hovers over the left edge of any existing media object on the stage, the indicator state switches to an insert mode. If the user releases the mouse while the indicator is in this mode, the underlying media object and all media objects to the right of the left edge of that media object will be offset to the right to allow for the dropped media object to fit on the stage without being obscured.

In another example, another technique utilizes one or more unconstrained animated button icons. Some applications use iconic images to represent actions that the user 102 may perform. As icons become smaller, they are difficult to discern and understand. The service interface application 182 uses animation and unbounded icons to convey visual information. In one aspect, a text tool icon in an idle state is an "A" (other applications often use a T as the text tool). On rollover, the A is revealed to be a window onto a cropped, sliding Add Text message, which animates to an edge. In another aspect, a soundtrack tool may be represented as a musical note, but on rollover, the notes play and rise outside of a representative button. To create these buttons, a designer may designate a static rectangle, which represents traditional bounds of the graphic. These bounds may be used by the button to determine the button bounds and scale. The innovative part is to not force all graphic icon content to lie within these bounds and set the button class to not clip its content. By triggering the animation on rollover, the design may exceed its bounds, while still preserving visual coherence in the idle state.

In another example, another technique utilizes one or more collapsible tabbed containers. When editing a collage or story, a button bar may represent one or more additional editing options. The collapsed bar may comprise a row of buttons, although each icon may be presented as a button rather than an icon. When the user 102 selects at least one of the buttons, the selected button transforms into a tab, and the bar expands horizontally to include the tab content. The user 102 may collapse the bar by selecting a close button in the bar or by selecting the currently open tab.

In another example, another technique utilizes an on-demand loading of media. A presentation may be represented as a document with a plurality of layers. Each layer may include various attributes, including position, scale, visual bounds, associated annotations (i.e., hotspots) and a target media asset, which may have layer specific properties, such as playback behaviors. When a player loads a collage or story, the player requests the first page of the collage document and specifies a number of layers per page. The server returns up to a page worth of layers, sorted by x position in the collage. The player may download one or more pages of layers and create a local indexed list of layers. Then, based on the visual window, the player may filter the layers down to the currently visible. For each layer, if the layer hasn't already been loaded or queued for loading, the layer is queued for loading.

In one implementation, the user 102 may add one or more hotspots to the media presentation or piece. A hotspot may be identified by a title as a cursor is moved over a designated hotspot area. Activating the hotspot by selecting the hotspot area may link the user 102 to additional information relating to the hotspot item. For example, if an automobile is used as a media item within the collage storyboard, a hotspot may link the user 102 to additional information relating to the automobile, such as price, condition, and terms or sale. Hotspots may be specific to one part or element of the media item. In this example, the user 102 may create a hotspot on the tire, which, when opened, may give the viewer access and/or information on the tire, where to buy the tire, etc. Other hotspots may link the user to music or other audio clips, and other media may be uploaded into the collage storyboard from a clipboard or link to sale items posted on the Internet. Once the media piece has been created the media piece may be viewed, saved, previewed and/or published. Once published, the user 102 may have options as to the playback. For example, the media presentation or piece may play continuously until stopped, play only for a specified number of times, play only once, etc.

In various implementations, using the various media creation and publishing tools described herein, a user 102 may quickly and easily create media rich presentations and use those presentations in numerous ways. Some examples include the ability to publish a presentation on a site to sell a particular item or service. For items or services, a media rich presentation may assist the seller with marketing and selling the item or service, which may be valuable for high-end or high-priced items or services. Sellers may be able to cross sell or promote items or services or direct consumers to partner commercial sites using the hotspot feature. Social or dating sites may use these presentations to give its users a meaningful way to present themselves to others. Blogs and personal pages may be more dynamic using RSS feeds, since, for example, a particular user's presentation may be continually changing with new media.

Figure 3:
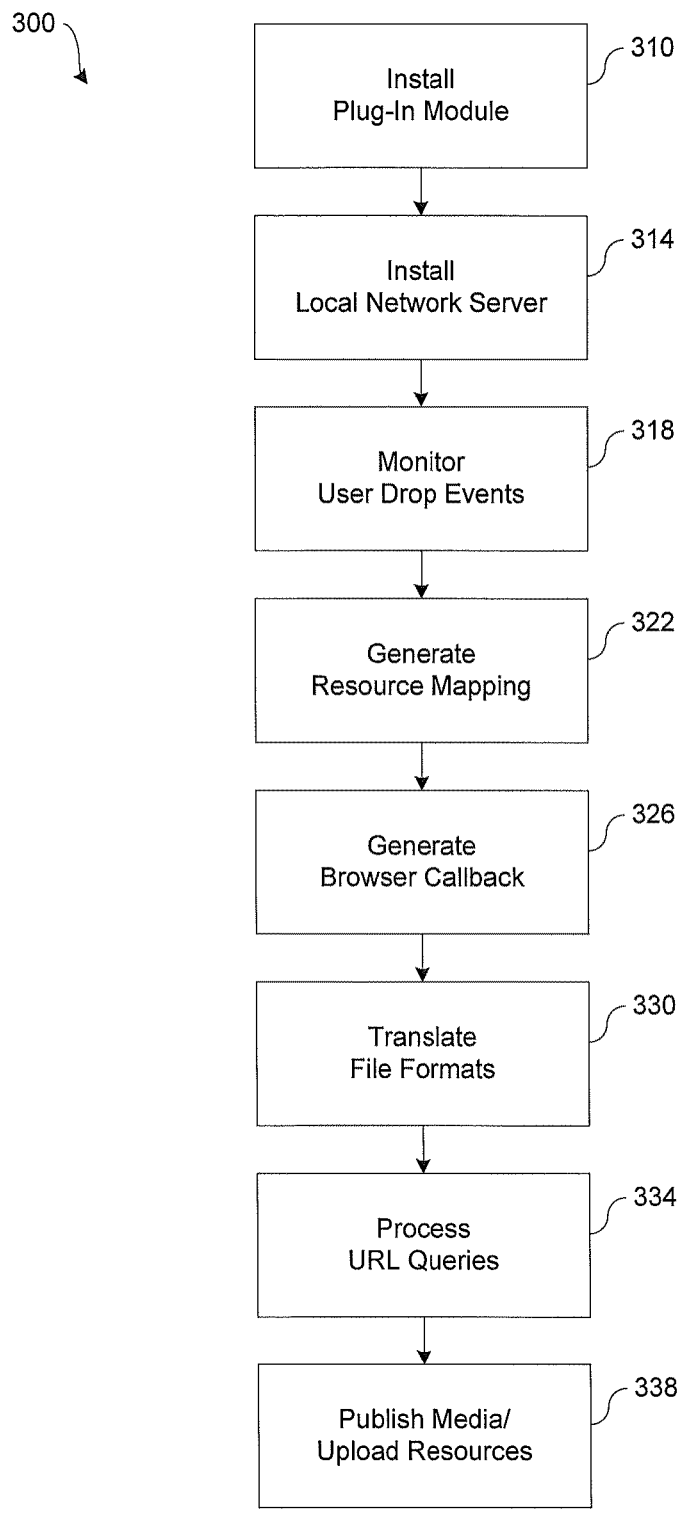
FIG. 3 shows a block diagram of a method to facilitate unification of local and remote resources over a network, in accordance with an embodiment of the present disclosure.

FIG. 3 shows one embodiment of a block diagram of a method 300 adapted to unify local and remote resources over the network 160, in reference to FIG. 1. In one aspect, the method 300 describes a process flow for working with local resources in a secure manner within a network-based application (e.g., a web-based application), while allowing the local resources to be shared over the network 160, such as the Internet. It should be appreciated that the order of the following process flow may be rearranged without departing from the scope of the present disclosure.

In one implementation, the plug-in module 124 is installed on the user device 120 (block 310). For example, the service provider device 180 downloads the plug-in module 124 to the user device 120 via the network 160 for installation on the user device 120. The plug-in module 124 is adapted to extend the browsing behavior of user interface application 122, when implemented, e.g., as a network browser, using one of several standard browser plug-in APIs.

Next, the plug-in module 124 is adapted to install a local network server 126 (block 314). In one implementation, the plug-in module 124 is adapted to install the client-side local network server 126 (e.g., local web-based server) that is adapted to operate external to the browsing operation of the user interface application 122, when implemented as a network browser. The user interface application 122 may include a JavaScript API file that is adapted to initialize the plug-in module 124 with a session ID and setup application callbacks for certain events. When initializing, the plug-in module 124 verifies that a local network service is running, starts the local network service if not running, and registers for user drag-and-drop events.

Next, user drag-and-drop events are monitored (block 318). The plug-in module 124, in one embodiment, may be associated with a rectangular area of interest specified within a browser Document Object Model by the OBJECT/EMBED width and height. If the user 102 drags a file or folder over the area of interest and drops (i.e., releases) the file or folder over the area of interest, then the plug-in module 124 is adapted to communicate with the local network server 126 over a transmission control protocol (TCP) backchannel to thereby pass the File path of the file or folder.

Next, the local network server 126 generates a resource mapping (block 322). In one embodiment, the local network server 126 maps a local file resource to a secure URL, based on the session ID, a pseudo random code, and the file name, and the local network server 126 returns the generated resource mapping to the plug-in module 124. Then, the plug-in module 124 generates a callback to the browser JavaScript environment (block 326). Depending on the browser environment, the browser callback may be immediate or a flag may be set, which the JavaScript environment may poll to detect events. In one aspect, a drop event passes the secure URL and filename to the JavaScript environment. The browser is adapted to access the mapped resource through the secure URL in a manner similar to a remote asset.

Next, the local network server 126 may be adapted to translate file formats to media formats (block 330). When dealing with media types, there may be a need for translating file formats to media formats and resolutions supported by common browsers. For example, a secure URL is adapted to support one or more query parameters that allow for specifying a desired resolution, rotation, and media format, and the local web server 126 is adapted to convert media files, if possible and/or if necessary.

Next, the local network server 126 may be adapted to process one or more secure URL queries (block 334). In one implementation, when the local server 126 receives an HTTP request, the local server 126 checks for an existing secure URL mapping, and if so, the local server 126 serves up the local file, applying any desired scaling, rotation, or format translations based on the URL query parameters. In one aspect, the user interface application 122 is adapted to process a secure URL resource in a similar manner as with a normal URL resource. However, the secure URL resource is served up locally to improve performance.

Next, the local network server 126 may be adapted to publish media and/or upload resources (block 338). In one implementation, once the user 102 has finished working on a media presentation and/or document and proceeds to publish and/or share the completed media presentation and/or document, the user interface application 122 performs a call to the plug-in module 124 indicating which resources need to be uploaded to the service provider device 180 via the network 160. In one aspect, the plug-in module 124 communicates any related information and resources over the TCP backchannel to the local network server 126, which begins to upload the related information and resources, which may be scaled and/or rotated, to the service provider device 180 via the network 160. In one aspect, this process (block 338) may continue running in the background.

Figure 4:
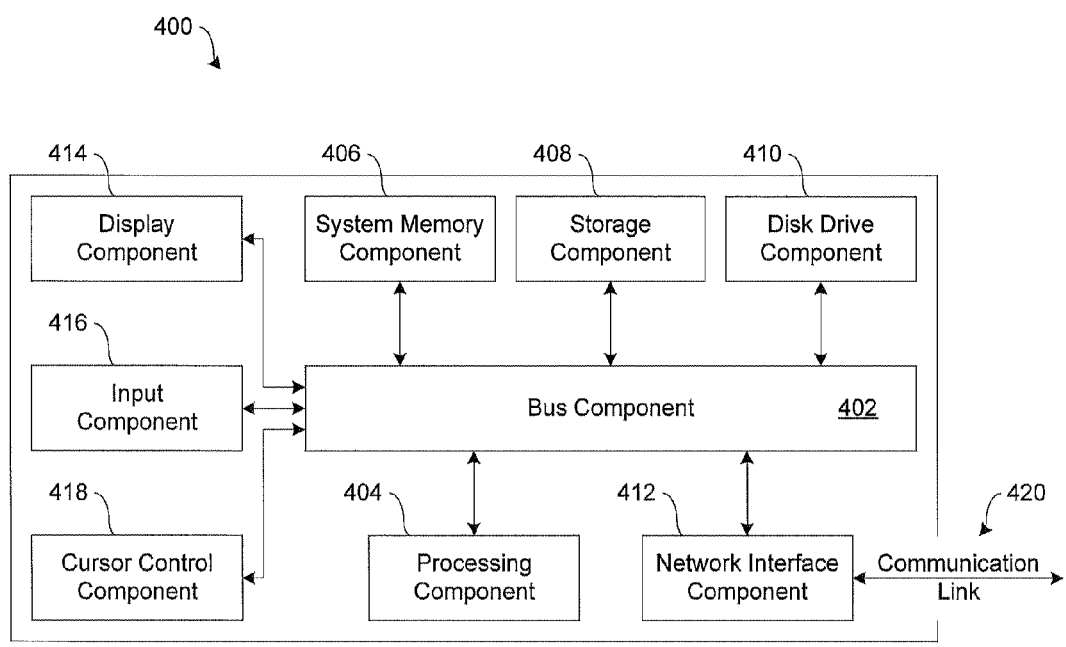
FIG. 4 is a block diagram of a computer system suitable for implementing one or more embodiments of the present disclosure.

FIG. 4 is a block diagram of a computer system 400 suitable for implementing one or more embodiments of tie present disclosure, including the user device 120, the one or more distribution channels 140, and the service provider device 180. In various implementations, the client device 140 may comprise a personal computing device capable of communicating with the network 160, such as a personal computer, laptop, cell phone, PDA, etc., the one or more merchant devices 140 may comprise a network computing device, such as a network server, and the service provider device 180 may comprise a network computing device, such as a network server. Hence, it should be appreciated that each of the devices 120, 140, 180 may be implemented as computer system 400 in a manner as follows.

In accordance with various embodiments of the present disclosure, computer system 400, such as a personal computer and/or a network server, includes a bus 402 and/or other communication mechanism for communicating information, which interconnects subsystems and components, such as processing component 404 (e.g., processor, micro-controller, digital signal processor (DSP), etc.), system memory component 406 (e.g., RAM), static storage component 408 (e.g., ROM), disk drive component 410 (e.g., magnetic or optical), network interface component 412 (e.g., modem or Ethernet card), display component 414 (e.g., CRT or LCD), input component 416 (e.g., keyboard), and cursor control component 418 (e.g., mouse or trackball). In one implementation, disk drive component 410 may comprise a database having one or more disk drive components.

In accordance with embodiments of the present disclosure, computer system 400 performs specific operations by processor 404 executing one or more sequences of one or more instructions contained in system memory component 406. Such instructions may be read into system memory component 406 from another computer readable medium, such as static storage component 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor 404 for execution. Such a medium may take many forms, including but not limited to, non-volatile media and volatile media. In various implementations, non-volatile media includes optical or magnetic disks, such as disk drive component 410, and volatile media includes dynamic memory, such as system memory component 406. In one implementation, data related to encoded logic may be transferred to computer system 400 via communication link 420, and various transmission media, such as coaxial cables, copper wire, and fiber optics, including wires that comprise bus 402, may be utilized in the transfer of data. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 420 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 400 may transmit and receive messages, data, information, and instructions, including one or more programs (i.e., application code) through communication link 420 and communication interface 412. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both components comprising software, hardware, and/or both without departing from the spirit of the present disclosure.

Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form amid detail without departing from the scope of the present disclosure. Thus, the present disclosure is limited only by the claims.

What is claimed is:

1. A method for facilitating information transactions over a network, the method comprising:
    communicating with a user device and one or more distribution channels via the network;
    installing a local network server on the user device;
    monitoring user drag and drop events;
    generating resource mapping of media resources based on the user drag and drop events;
    generating a browser callback to detect user drag and drop events, wherein a user drag and drop event passes a filename and a secure URL mapped to a local file resource accessible to the browser; and
    uploading media resources.

2. The method of claim 1, further comprising:
    gathering media resources based on user input;
    creating a media presentation with the media resources based on user input; and
    publishing the media presentation by distributing the media presentation to the one or more distribution channels via the network.

3. The method of claim 1, further comprising:
    verifying communication with the user device; and
    installing a plug-in module on the user device that is adapted to install the local network server on the user device and monitor user drag and drop events,
    wherein monitoring the user drag and drop events comprises passing one or more filenames of local file resources to the plug-in module.

4. The method of claim 1, further comprising:
    translating file formats of media resources to recognizable media formats.

5. The method of claim 1, wherein the media resources comprise local file resources stored locally on the user device.

6. The method of claim 1, wherein generating resource mapping of media resources comprises mapping a local file resource to a secure URL, and wherein the secure URL supports one or more query parameters including at least one of resolution, rotation, and media format.

7. The method of claim 6, further comprising processing secure URL queries by accessing media resources via one or more secure URLs.

8. The method of claim 1, further comprising:
receiving an HTTP request for a local file resource;
checking for a secure URL related to the local file resource;
retrieving the local file resource if a secure URL exists for the local file resource; and
applying one or more requested query parameters to the local file resource including at least one of resolution, rotation, and media format.

9. The method of claim 1, further comprising storing the media resources in a storage component of the user device.

10. The method of claim 1, wherein the media resources comprise related identity information including at least one of a title, a storage location, and description.

11. The method of claim 1, wherein communicating with the user comprises receiving user input from the user via the network.

12. The method of claim 1, wherein at least one network server is associated with each of the one or more distribution channels, and wherein each network server is adapted to communicate with the user device.

13. The method of claim 1, wherein method is executed by a network server adapted to communicate with the user device and one or more distribution channels via the network.

14. A system for facilitating information transactions over a network, the method comprising:
means for communicating with a user device and one or more distribution channels via the network;
means for installing a local network server on the user device;
means for monitoring user drag and drop events;
means for generating a browser callback to detect user drag and drop events, wherein a user drag and drop event passes a filename and a secure URL mapped to a local file resource accessible to the browser;
means for generating resource mapping of media resources based on the user drag and drop events; and
means for uploading media resources.

15. The system of claim 14, further comprising:
means for gathering media resources based on user input;
means for creating a media presentation with the media resources based on user input; and
means for publishing the media presentation by distributing the media presentation to the one or more distribution channels via the network.

16. The system of claim 14, further comprising:
means for verifying communication with the user device; and
means for installing a plug-in module on the user device that is adapted to install the local network server on the user device and monitor user drag and drop events,
wherein monitoring the user drag and drop events comprises passing one or more filenames of local file resources to the plug-in module.

17. A non-transitory computer readable medium on which are stored computer readable instructions for execution and when executed operable to:
communicate with a user device and one or more distribution channels via the network;
install a local network server on the user device;
monitor user drag and drop events;
generate a browser callback to detect user drag and drop events, wherein a user drag and drop event passes a filename and a secure URL, mapped to a local file resource accessible to the browser;
generate resource mapping of media resources based on the user drag and drop events; and
upload media resources.

18. The non-transitory computer readable medium of claim 17, further operable to:
gather media resources based on user input;
create a media presentation with the media resources based on user input; and
publish the media presentation by distributing the media presentation to the one or more distribution channels via the network.

19. The non-transitory computer readable medium of claim 17, further operable to:
verify communication with the user device; and
install a plug-in module on the user device that is adapted to install the local network server on the user device and monitor user drag and drop events,
wherein monitoring the user drag and drop events comprises passing one or more filenames of local file resources to the plug-in module.

* * * * *

UNITED STATES PATENT AND TRADEMARK OFFICE
CERTIFICATE OF CORRECTION

| | | Page 1 of 1 |
|---|---|---|
| PATENT NO. | : 8,010,629 B2 | |
| APPLICATION NO. | : 12/495756 | |
| DATED | : August 30, 2011 | |
| INVENTOR(S) | : James W. Lanahan, Dane M. Howard and Brian F. Williams | |

It is certified that error appears in the above-identified patent and that said Letters Patent is hereby corrected as shown below:

In column 4, line 49, please delete the words "mid/or" and replace them with "and/or".

In column 6, line 59, please delete the number "25.".

In column 14, line 25, please delete the word "amid" and replace it with "and.".

Signed and Sealed this

Seventeenth Day of April, 2012

David J. Kappos
*Director of the United States Patent and Trademark Office*